(12) United States Patent
Ahn

(10) Patent No.: US 8,127,747 B2
(45) Date of Patent: Mar. 6, 2012

(54) LUBRICATION APPARATUS OF FUEL PUMP DRIVEN BY FUEL PUMP DRIVE CAM

(75) Inventor: Gil Hyun Ahn, Hwaseong (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 316 days.

(21) Appl. No.: 12/500,176

(22) Filed: Jul. 9, 2009

(65) Prior Publication Data
US 2010/0139609 A1    Jun. 10, 2010

(30) Foreign Application Priority Data
Dec. 4, 2008    (KR) .................. 10-2008-0122760

(51) Int. Cl.
*F01M 1/06*    (2006.01)

(52) U.S. Cl. .............. 123/508; 123/196 R; 123/90.33; 123/90.34

(58) Field of Classification Search .............. 123/508, 123/509, 196 R, 90.33–90.38
See application file for complete search history.

(56) References Cited

U.S. PATENT DOCUMENTS
4,476,836 A * 10/1984 Enomoto et al. .............. 123/502
4,538,561 A *  9/1985 Amemori et al. ........... 123/90.44
(Continued)

FOREIGN PATENT DOCUMENTS
JP    9-158807 A    6/1997
(Continued)

*Primary Examiner* — Thomas Moulis
(74) *Attorney, Agent, or Firm* — Morgan, Lewis & Bockius LLP

(57) ABSTRACT

A lubrication apparatus of a fuel pump, which lubricates a tappet and a fuel pump drive cam of the fuel pump, may include a cylinder head having an oil gallery formed therein and a camshaft disposed therethrough, wherein the fuel pump is coupled to the cylinder head, and a penetrating passage penetrating the cylinder head and connected to the oil gallery to supply oil from the oil gallery to the inside of a fuel pump adaptor connected to the fuel pump.

14 Claims, 3 Drawing Sheets

U.S. PATENT DOCUMENTS

| | | | |
|---|---|---|---|
| 5,398,658 A * | 3/1995 | Mesimaki | 123/509 |
| 5,603,303 A * | 2/1997 | Okajima et al. | 123/508 |
| 5,984,650 A * | 11/1999 | Okubo et al. | 417/470 |
| 2010/0071655 A1* | 3/2010 | Kim | 123/196 R |
| 2010/0139610 A1* | 6/2010 | Park | 123/196 R |
| 2011/0030649 A1* | 2/2011 | Nagao | 123/196 R |
| 2011/0100319 A1* | 5/2011 | Shin | 123/196 R |
| 2011/0126793 A1* | 6/2011 | Ahn | 123/196 R |
| 2011/0146626 A1* | 6/2011 | Maruyama et al. | 123/495 |

FOREIGN PATENT DOCUMENTS

| | | |
|---|---|---|
| JP | 2000-291503 A | 10/2000 |

\* cited by examiner

LUBRICATION APPARATUS OF FUEL PUMP DRIVEN BY FUEL PUMP DRIVE CAM

CROSS-REFERENCE TO RELATED APPLICATION

The present application claims priority to Korean Patent Application Number 10-2008-0122760 filed Dec. 4, 2008, the entire contents of which application is incorporated herein for all purposes by this reference.

BACKGROUND OF THE INVENTION

1. Field of the Invention

The present invention relates to a lubrication structure of an engine, and more particularly to a fuel pump lubrication device that is capable of effectively lubricating a tappet of the engine, a tappet roller, and a cam.

2. Description of Related Art

Technologies for a gasoline direct injection (GDI) engine have been studied in order to improve fuel consumption and performance of the engine.

The GDI engine technologies are methods in which only air is drawn into the combustion chamber and is compressed and then fuel is injected therein, while in the case of a conventional gasoline engine, power is generated in a period of an intake stroke, a compression stroke, an ignition stroke, and an exhaust stroke process of an air/fuel mixture. Such a method is similar to a compressed ignition engine method.

Due to a high compression ratio of the GDI engine, a high compression ratio that is capable of exceeding a limit of a usual gasoline engine results in maximization of fuel consumption.

The GDI engine depends on a high fuel pressure, and a high performance fuel pump is required.

The fuel pump is mechanically driven by a cam so as to operate a tappet, and friction inside the fuel pump is generated. A great deal of friction occurs in the fuel pump due to the high pressure of the fuel.

Therefore, a lubrication device of the fuel pump for compressing the fuel in the GDI engine has been studied in order to improve durability and performance of the GDI engine.

To solve the problems, as an example, a method of lubricating the cam with oil stored in a predetermined space when a camshaft for the fuel pump is rotated. Such a method has a merit of simplifying the structure, but it is difficult to lubricate throughout the fuel pump, and further it is difficult to lubricate it of slanted surface.

Further, there is a method, as another example, which forms an oil hole at the cam so as to flow oil therein.

However, the method mentioned above has a drawback in that it is capable of lubricating only a specific part that is provided with an oil hole, and it is impossible to form a hole at a portion of the cam contacting the tappet of the fuel pump.

In addition, the cam rotates in such a state in which it rotatably contacts the roller mounted at the bottom of the cam so as to operate the tappet upwardly and downwardly, and the conventional tappet lubrication structure of the engine guides the tappet upwardly and downwardly by the roller between the tappet and the cam, but contact surfaces between the tappet and the fuel pump adaptor and between the cam and the roller are not lubricated smoothly thereby inducing abrasion, and consequently durability and rotation thereof are deteriorated.

Therefore, due to the abrasion occurring at the roller interposed between the cam and the roller tappet, durability thereof is deteriorated and thereby manufacturing cost is increased, and noise occurs at the connected portion thereof.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide a lubrication apparatus of a fuel pump driven by a fuel pump drive cam having advantages of simultaneously lubricating the fuel pump drive cam, the tappet roller, and a contact portion between the interior circumference of the fuel pump adaptor and the tappet, minimizing abrasion, and decreasing noise caused by friction.

In an aspect of the present invention, the lubrication apparatus of a fuel pump, which lubricates a tappet and a fuel pump drive cam of the fuel pump, may include a cylinder head having an oil gallery formed therein and a camshaft disposed therethrough, wherein the fuel pump is coupled to the cylinder head, and a penetrating passage penetrating the cylinder head and connected to the oil gallery to supply oil from the oil gallery to the inside of a fuel pump adaptor connected to the fuel pump.

The apparatus may further include a fuel pump adaptor lubrication passage formed inside a body of the fuel pump adapter and connected to the penetrating passage to supply the oil to an inner wall of the fuel pump adaptor through the body thereof.

The fuel pump adaptor lubrication passage may be bifurcated into at least two lubrication nozzles in the body of the fuel pump adapter.

One lubrication nozzle of the at least two lubrication nozzles may extend to a first interior wall of the inner wall of the fuel pump adaptor so as to supply the oil to a contacting portion of the fuel pump adaptor and the tappet moving reciprocally along the first interior wall.

The other lubrication nozzle of the at least two lubrication nozzles may extend to a second interior wall of the fuel pump adaptor so as to supply the oil to the fuel pump drive cam, the second interior wall slidingly-contacting with the fuel pump drive cam, wherein an outlet of the other lubrication nozzle is configured and dimensioned to be wider than an inlet thereof.

The at least two lubrication nozzles may be formed obliquely with respect to a length direction of the fuel pump adaptor, respectively.

The oil gallery may be configured to supply the oil to the fuel pump of a gasoline direct injection (GDI) engine.

In another aspect of the present invention, the lubrication apparatus of a fuel pump, which lubricates a tappet and a fuel pump drive cam of the fuel pump, may include a cylinder head having an oil gallery formed therein and a camshaft disposed therethrough, wherein the fuel pump is coupled to the cylinder head, a penetrating passage penetrating the cylinder head and connected to the oil gallery to supply oil from the oil gallery to the inside of a fuel pump adaptor connected to the fuel pump, and a fuel pump adaptor lubrication passage formed inside a body of the fuel pump adapter and connected to the penetrating passage to supply the oil to an inner wall of the fuel pump adaptor through the body thereof, wherein the fuel pump adaptor lubrication passage is bifurcated into at least two lubrication nozzles in the body of the fuel pump adapter.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
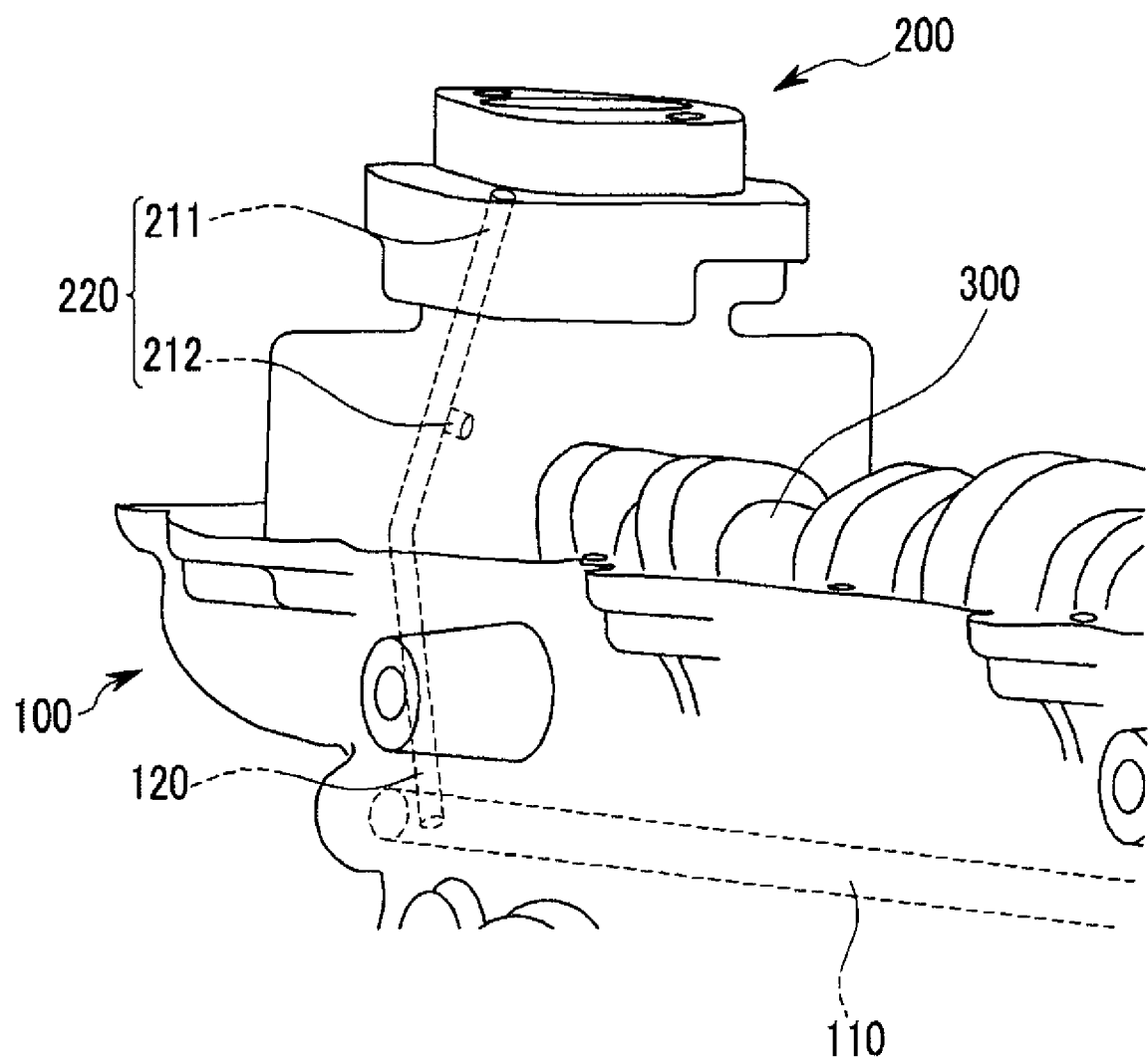
FIG. 1 is a sectional view of an exemplary lubrication apparatus of a fuel pump driven by a fuel pump drive cam showing a main portion according to the present invention.
Figure 2:
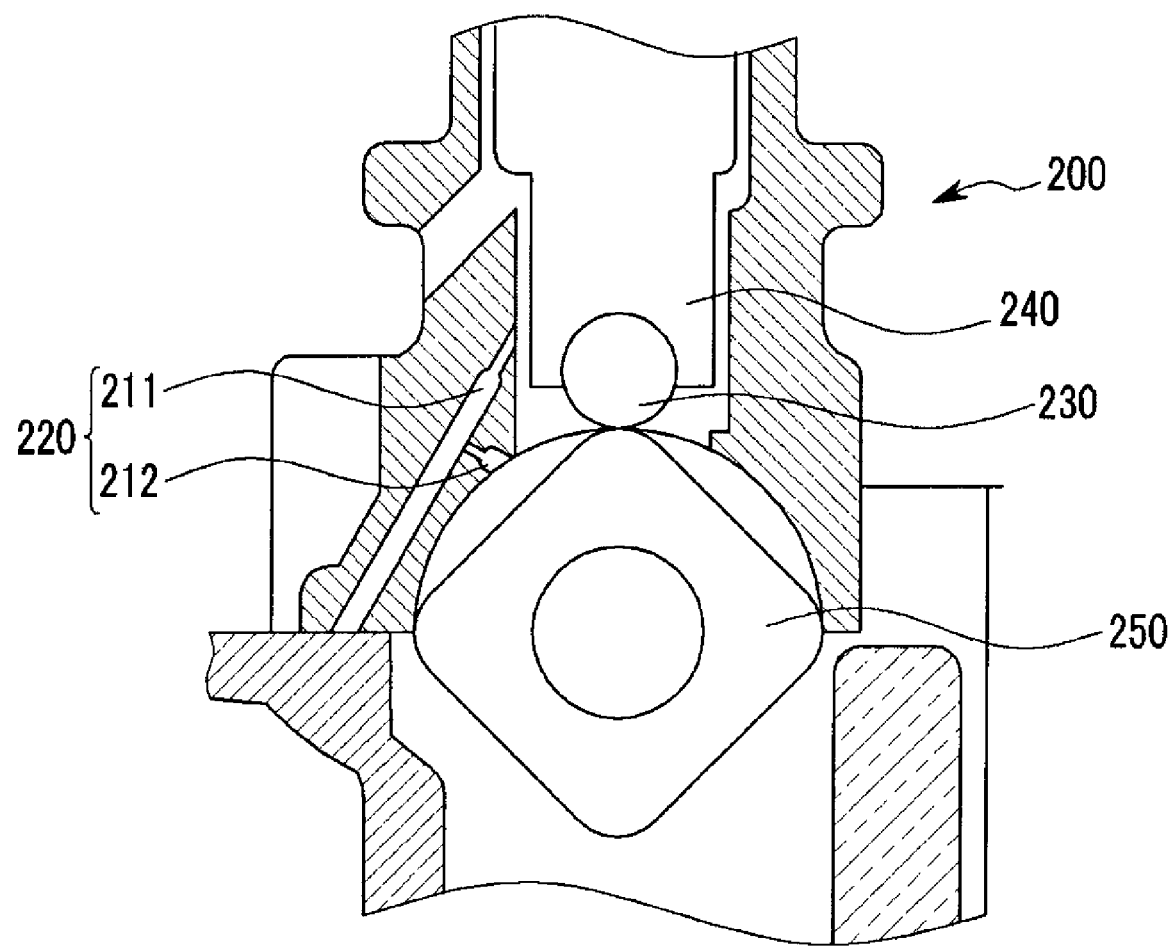
FIG. 2 is a schematic view of an exemplary lubrication apparatus of a fuel pump driven by a fuel pump drive cam showing a cylinder head adapted thereto according to the present invention.
Figure 3:
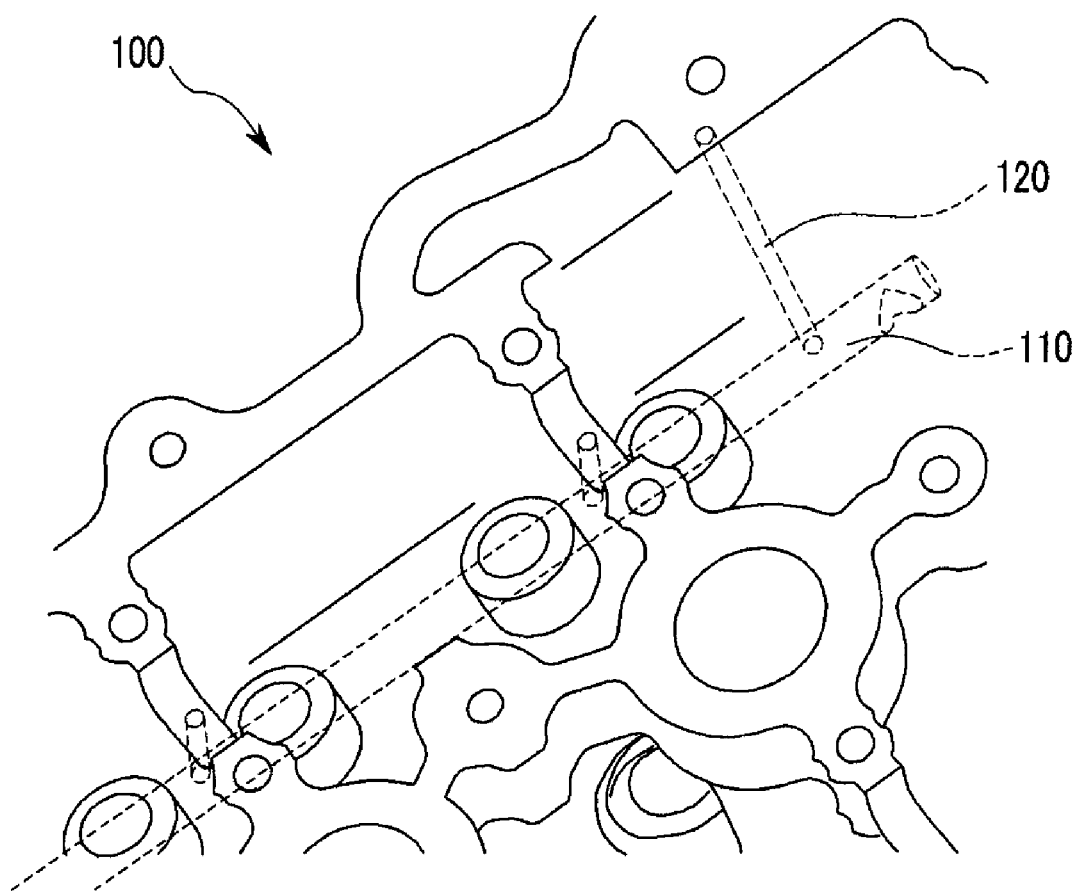
FIG. 3 is a schematic view of an exemplary lubrication apparatus of a fuel pump driven by a fuel pump drive cam showing a cylinder block adapted thereto according to the present invention.

FIG. 1 is a sectional view of a lubrication apparatus of a fuel pump driven by a cam showing a main portion according to various embodiments of the present invention, FIG. 2 is a schematic view of a lubrication apparatus of a fuel pump driven by a cam showing a cylinder head adapted thereto according to various embodiments of the present invention, and FIG. 3 is a schematic view of a lubrication apparatus of a fuel pump driven by a cam showing a cylinder block adapted thereto according to various embodiments of the present invention.

As shown in FIG. 1, FIG. 2, and FIG. 3, a lubrication apparatus of a fuel pump driven by a cam according to various embodiments of the present invention includes a cylinder head 100 having an oil gallery 110 therein, a penetrating passage 120, and a fuel pump adaptor lubrication path 220 communicated to the penetrating passage 120. In addition, reference numeral 300 in the drawing indicates a cam shaft 300 including a plurality of cams.

The fuel pump adaptor lubrication path 220 includes a tappet lubrication nozzle 211 and a cam lubrication nozzle 212 dividedly branched therefrom so as to lubricate the inner portion of a fuel pump adaptor 200.

That is, the oil exhausted from an oil pump is provided to the fuel pump adaptor 200 via the oil gallery 110 and the penetrating passage 120 so as to lubricate and cool the fuel pump adaptor 200.

The tappet lubrication nozzle 211 and the cam lubrication nozzle 212 are formed inside the fuel pump adaptor 200 facing upwardly.

Herein, the tappet lubrication nozzle 211 and the cam lubrication nozzle 212 may be extended from the end portion of the fuel pump adaptor lubrication passage 220.

The tappet lubrication nozzle 211 is formed so as to supply oil to a side surface of the tappet 240 mounted inside the high-pressure fuel pump adaptor 200, a contact portion between the tappet roller 230 mounted at the bottom of the tappet, and the fuel pump drive cam 250 disposed under the tappet roller 230.

An end portion of the tappet lubrication nozzle 211 may slant upwardly toward a side surface of the tappet 240.

Therefore, the oil is exhausted therefrom, and the oil lubricates the tappet roller 230 disposed at a bottom thereof and the fuel pump drive cam 250 by its own weight.

Meanwhile, the cam lubrication nozzle 212 is formed so that it supplies the oil to a portion between the fuel pump drive cam 250 and the tappet roller 230.

The cam lubrication nozzle 212 may preferably be formed to slant toward the fuel pump drive cam 250.

Further, the tappet roller 230 lubricates a contact portion of the fuel pump drive cam 250 by the oil via the cam lubrication nozzle 212.

In various embodiments of the present invention, the outlet of the cam lubrication nozzle 212 may be formed wider than the inlet thereof so that the oil can be sprayed widely onto the fuel pump drive cam 250.

As can be seen, owing to a reduction of frictional resistance of a portion between the tappet 240 and the tappet roller 230, abrasion of the bottom of the tappet 240 is prevented.

Therefore, such a lubrication apparatus of a fuel pump driven by a cam can lubricate the fuel pump drive cam 250, the tappet roller 230, and a contact portion between the interior circumference of the fuel pump adaptor 200 and the tappet 240 simultaneously, and thereby the abrasion is minimized and noise caused by friction is decreased.

For convenience in explanation and accurate definition in the appended claims, the term "lower" is used to describe features of various embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the claims appended hereto and their equivalents.

What is claimed is:

1. A lubrication apparatus of a fuel pump, which lubricates a tappet and a fuel pump drive cam of the fuel pump, comprising:

a cylinder head having an oil gallery formed therein and a camshaft disposed therethrough, wherein the fuel pump is coupled to the cylinder head; and a penetrating passage penetrating the cylinder head and connected to the oil gallery to supply oil from the oil gallery to the inside of a fuel pump adaptor connected to the fuel pump.

2. The apparatus of claim 1, further comprising a fuel pump adaptor lubrication passage formed inside a body of the fuel pump adapter and connected to the penetrating passage to supply the oil to an inner wall of the fuel pump adaptor through the body thereof.

3. The apparatus of claim 2, wherein the fuel pump adaptor lubrication passage is bifurcated into at least two lubrication nozzles in the body of the fuel pump adapter.

4. The apparatus of claim 3, wherein one lubrication nozzle of the at least two lubrication nozzles extends to a first interior wall of the inner wall of the fuel pump adaptor so as to supply the oil to a contacting portion of the fuel pump adaptor and the tappet moving reciprocally along the first interior wall.

5. The apparatus of claim 3, wherein the other lubrication nozzle of the at least two lubrication nozzles extends to a second interior wall of the fuel pump adaptor so as to supply the oil to the fuel pump drive cam, the second interior wall slidingly-contacting with the fuel pump drive cam.

6. The apparatus of claim 5, wherein an outlet of the other lubrication nozzle is configured and dimensioned to be wider than an inlet thereof.

7. The apparatus of claim 3, wherein one lubrication nozzle of the at least two lubrication nozzles extends to a first interior wall of the inner wall of the fuel pump adaptor so as to supply the oil to a contacting portion of the fuel pump adaptor and the tappet moving reciprocally along the first interior wall, and wherein the other lubrication nozzle of the at least two lubrication nozzles extends to a second interior wall of the fuel pump adaptor so as to supply the oil to the fuel pump drive cam, the second interior wall slidingly-contacting with the fuel pump drive cam.

8. The apparatus of claim 7, wherein the one and the other lubrication nozzles are formed obliquely with respect to a length direction of the fuel pump adaptor, respectively.

9. The apparatus of claim 3, wherein the at least two lubrication nozzles are formed obliquely with respect to a length direction of the fuel pump adaptor, respectively.

10. The apparatus of claim 1, wherein the oil gallery is configured to supply the oil to the fuel pump of a gasoline direct injection (GDI) engine.

11. A lubrication apparatus of a fuel pump, which lubricates a tappet and a fuel pump drive cam of the fuel pump, comprising:
    a cylinder head having an oil gallery formed therein and a camshaft disposed therethrough, wherein the fuel pump is coupled to the cylinder head;
    a penetrating passage penetrating the cylinder head and connected to the oil gallery to supply oil from the oil gallery to the inside of a fuel pump adaptor connected to the fuel pump; and
    a fuel pump adaptor lubrication passage formed inside a body of the fuel pump adapter and connected to the penetrating passage to supply the oil to an inner wall of the fuel pump adaptor through the body thereof,
    wherein the fuel pump adaptor lubrication passage is bifurcated into at least two lubrication nozzles in the body of the fuel pump adapter.

12. The apparatus of claim 11, wherein one lubrication nozzle of the at least two lubrication nozzles extends to a first interior wall of the inner wall of the fuel pump adaptor so as to supply the oil to a contacting portion of the fuel pump adaptor and the tappet moving reciprocally along the first interior wall.

13. The apparatus of claim 11, wherein the other lubrication nozzle of the at least two lubrication nozzles extends to a second interior wall of the fuel pump adaptor so as to supply the oil to the fuel pump drive cam, the second interior wall slidingly-contacting with the fuel pump drive cam.

14. The apparatus of claim 13, wherein an outlet of the other lubrication nozzle is configured and dimensioned to be wider than an inlet thereof.

\* \* \* \* \*